United States Patent [19]
Ueda et al.

[11] 3,906,519
[45] Sept. 16, 1975

[54] SINGLE LENS REFLEX CAMERA LIGHT MEASURING SYSTEM

[75] Inventors: Hiroshi Ueda, Nara; Akira Yoshizaki, Osaka, both of Japan

[73] Assignee: Minolta Camera Kabushiki Kaisha, Osaka, Japan

[22] Filed: July 16, 1973

[21] Appl. No.: 379,685

[30] Foreign Application Priority Data
July 31, 1972 Japan.............................. 47-90660

[52] U.S. Cl.............................. 354/59; 354/156
[51] Int. Cl.² .................... G03B 7/00; G03B 19/12
[58] Field of Search ............... 95/42, 10 C, 10 P; 250/237 R; 352/143–145; 354/152, 154, 155, 156, 59, 55

[56] References Cited
UNITED STATES PATENTS

| | | | |
|---|---|---|---|
| 3,446,126 | 5/1969 | Leitz et al. | 250/237 R X |
| 3,532,043 | 10/1970 | Shimura | 95/10 PO |
| 3,675,557 | 7/1972 | Yokozato | 95/42 |
| 3,690,241 | 9/1972 | Nomura | 95/42 |
| 3,713,369 | 1/1973 | Fujii | 354/59 X |
| 3,770,965 | 11/1973 | Edwards et al. | 250/237 X |

*Primary Examiner*—Samuel S. Matthews
*Assistant Examiner*—F. M. O'Connor
*Attorney, Agent, or Firm*—Wolder & Gross

[57] ABSTRACT

A single lens reflex camera includes a mirror swingable to a retracted position prior to shutter release and manually swingable to its retracted position independent of shutter release and having a light attenuating light transmitting section. A photoresistor is located between the camera focal plane and the mirror light transmitting section and is retracted with the initiation of shutter release. Means are provided for compensating for the increased light incident on the photoresistor with the manual retraction of the mirror, such as by advancing a light attenuating filter into registry with the photoresistor with the mirror manual retraction or by providing in the leg of a bridge network having the photoresistor in a leg, a resistor network whose resistance is varied by a fixed increment with the manual retraction of the mirror.

5 Claims, 3 Drawing Figures

PATENTED SEP 16 1975

SINGLE LENS REFLEX CAMERA LIGHT MEASURING SYSTEM

BACKGROUND OF THE INVENTION

The present invention relates generally to improvements in camera light measuring systems and it relates generally to an improved light measuring system in a single lens reflex camera in which the photosensitive member is located proximate the film plane behind the camera swinging mirror and receives its light through a light transmitting section of the mirror, the mirror being selectively manually retractable independently of the shutter release.

In the conventional single lens reflex camera of the above type, the mirror is moved upwardly by operating the shutter release, and the shutter begins to open when the mirror approaches its fully retracted position.

There are some cases, however, when the retraction movement of the mirror in association with the operation of the shutter release should be avoided for various reasons. For example, with an objective lens of very short focal length, it is highly desirable that the mirror be retracted or swung upwardly beforehand independently of the movement of shutter release because a part of the lens may intercept the path of the mirror. The same requirement applies to photography where camera vibration due to the mirror movement should be avoided.

In such a case, however, since the light received for measurement is incident on a photosensitive member located rearwardly of the mirror, differences in the measured light quantity are caused by the different positions of the mirror, in other words, the measured light quantity through the mirror is smaller than that when the mirror has been moved upwardly, because the light is directly received rather than transmitted through a translucent or light attenuating portion of the mirror. Accordingly, as a consequence, automatic exposure control cannot be accurately achieved when the mirror has been moved upwardly by manual means beforehand. To overcome this drawback, the conventional but negative inconvenient and awkward means has been proposed wherein a warning is provided which notifies the user that the automatic exposure control is not effective when the mirror has been moved upwardly independently of the movement of the shutter release.

SUMMARY OF THE INVENTION

It is a principal object of the present invention to provide an improved camera light measuring system.

Another object of the present invention is to provide an improved through the lens light measuring system in a single lens reflex camera.

Still another object of the present invention is to provide an improved light measuring system in a single lens reflex camera having a mirror which is manually retractable independently of the camera shutter release and the photosensitive member is located rearwardly of the advanced mirror and receives its light through a light attenuating section of the mirror.

A further object of the present invention is to provide a light measuring system of the above nature which permits an accurate automatic exposure control or a coupled manual exposure control and is reliable, accurate, simple, rugged and highly versatile and adaptable.

The above and other objects of the present invention will become apparent from a reading of the following description taken in conjunction with the accompanying drawing which illustrates preferred embodiments thereof.

In a sense, the present invention contemplates the provision of, in a single lens reflex camera including a mirror movable between an advanced position intercepting the light between the camera objective lens and the film focal plane and a retracted position and having a light transmitting light attenuating portion, means for retracting the mirror with the shutter release and manually independently of shutter release, a light measuring system comprising a photosensitive member positioned in the path of light through the mirror light transmitting portion in its advanced position and means for varying the response of the light measuring system in response to the manual retraction of the mirror to compensate for the increased amount of light incident on the photosensitive member attendant to the retraction of the mirror.

In a preferred form of the improved light measuring system there is provided a filter having the same light attenuation as the mirror light transmitting portion and means for advancing the filter into registry with the photosensitive member with the manual retraction of the mirror. In the form of the measuring system provided with electrical compensation for the increased light on the photosensitive member, the photosensitive member is in one leg of a bridge and in another leg of the bridge there is a resistor network whose resistance is decreased a predetermined amount with the manual retraction of the mirror.

The improved light measuring system is simple, versatile and accurate and assures proper light measurement in a camera of the subject nature for automatic exposure control, coupled exposure control or any other type of light measurement whether the mirror is manually retracted or retracted with the shutter release.

DESCRIPTION OF THE PREFERRED EMBODIMENTS

Figure 1:
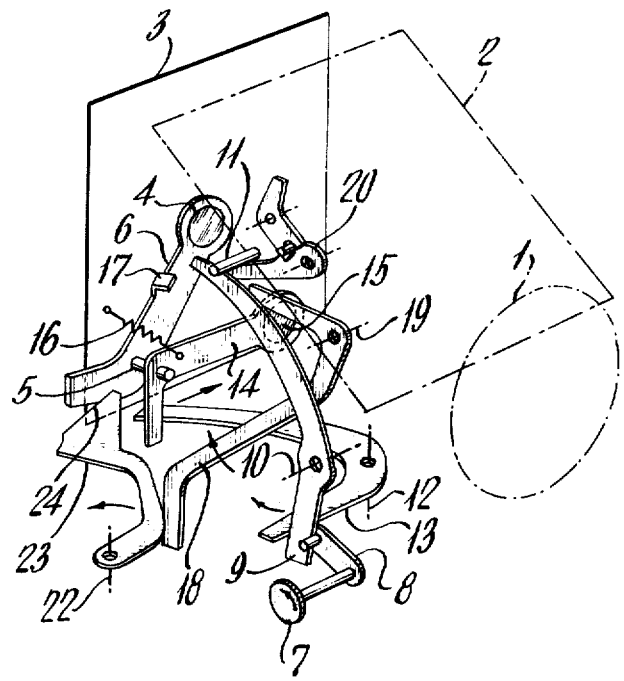
FIG. 1 is a perspective view of a light measuring compensating mechanism embodying the present invention.

Referring now to the drawing and particularly FIG. 1 thereof which illustrates a preferred embodiment thereof and wherein the compensating mechanism is shown by the shaded elements, the reference numeral 2 generally designates the swingable mirror in a single lens reflex camera which includes a photographic objective lens 1, a focal plane shutter curtain 3 and a light receiving photosensitive element 4, located shortly forward of the focal plane 3.

The light receiving element 4 is attached to a lever 6 which is pivotally mounted for rotation about a shaft 5, and, in the usual operation, the lever 6 swings downwardly to thereby retract the light receiving element 4 from the objective lens optical path, when a shutter release button is depressed, after which a shutter leading curtain commences to travel to open the camera shutter after the mirror 2 has been moved upwardly to its retracted position. The retraction of the mirror upwardly independently of the shutter release is accomplished by turning the lever 8 by means of a knob 7. The counter-clockwise rotation of the lever 8 causes the lever 9 to pivot about an axis 10 in a clockwise direction, such that the upper edge of the other or upper leg of the lever 9 urges a pin 11 extending from the side of the mirror 2 upwardly, to move the mirror 2 upwardly to its retracted position. At the same time, the lower end of the lever 9 urges a lever 13, which is rotatable about an axis 12 in a horizontal plane, to rotate the lever 13 in a clockwise direction as shown by the arrow. Thus, the rear end of the lever 13 (shown to the left in the drawing) moves to the right as shown. Shown at 14 is a lever which is rotatable about the shaft 5 which also rotatably supports the lever 6, the lever 14 being provided with a light reducing or attenuating filter 15 at the end thereof and being urged upwardly under the influence of a spring 16, such that the lever 14 will swing upwardly with the rear end of the lever 13 moving to the right and will eventually abut a projection provided on the lever 6, whereupon the light receiving element 4 is covered by the filter 15.

The transmission factor of the light reducing filter 15 is such as to be equal to that of the light from the object which has passed through the translucent light attenuating, light transmitting portion of the mirror 2 in an oblique direction, such that even after the mirror 2 has been moved upwardly to its retracted position, the light quantity received by the light receiving element 4 will remain the same as that before the mirror has been retracted, thus presenting a precise and accurate light measuring output or signal.

The operation upon the shutter being released is the same either in the usual case or in the case where the mirror is manually independently retracted. When the shutter release button is pushed, the lever 18 swings about the axis 19 in a direction shown by the arrow, whereby the upper end of the lever 18 urges a lever 20 upwardly which in turn pushes the pin 11 upwardly together with and to retract the mirror 2, in the event that mirror has not been moved upwards beforehand. Then, the lower end of the lever 18 pushes a lever 23 which is swingable about an axis 22 in a horizontal plane to thereby rotate the lever 23 in a counter-clockwise direction, whereby the oblique cam defining edge 24 of the rear edge of the lever 23 is retracted. The retraction of the oblique edge 24 causes the upward movement of the left end of the lever 6 in contact therewith such that the lever 6 pivots downwardly in a clockwise direction so as to retract the light receiving element 4 downwardly from the optical path. When the mirror 2 has been previously manually retracted the lever 14 assumes the upper position as described, but the lever 14 will be pushed downwardly together with the lever 6 by means of the projection 17.

Figure 2:
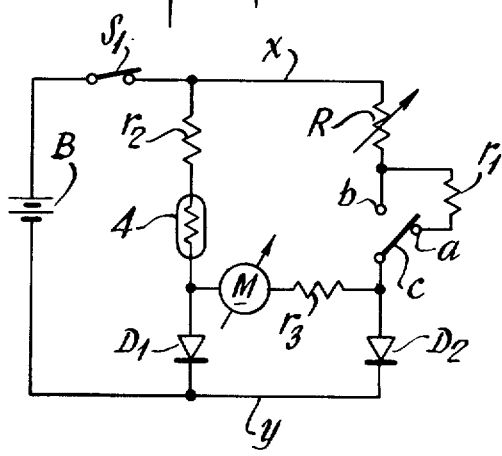
FIG. 2 is a circuit diagram of another embodiment of the present invention.
Figure 3:
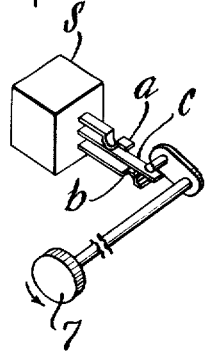
FIG. 3 is a perspective view of the compensation switch of the network of FIG. 2.

In FIGS. 2 and 3 of the drawing there is illustrated another embodiment of the present invention in which electrical compensation is employed. The mechanism is similar to that of the first embodiment, except that the levers 13 and 14 and the light filter 15 are eliminated. A double throw switch S is provided which includes a pair of stationary contact elements $a$ and $b$ and an arm $c$ normally resiliently urged into engagement with contact element $a$. A pin on the lever 8 which is swingable by means of knob 7 to manually retract mirror 2 bears on switch arm $c$ to transfer it from contact element $a$ to contact element $b$ with the rotation of knob 7 to retract the mirror 2.

The electrical light measuring network is in the form of a bridge or balancing circuit and includes a battery B connected through a switch $S_1$ between lines $x$ and $y$. Connected in series between lines $x$ and $y$ are a resistor $r_2$, the photosensitive element 4 which is in the form of a photoresistor and a diode $D_1$, the resistor $r_1$ being connected to line $x$. Line $x$ is also connected through a variable resistor R to switch contact element $b$ and in series with a resistor $r_1$ to switch contact element $a$. The switch arm $c$ is connected through diode $D_2$ to line $y$, diode $D_2$ being oriented in the same direction as diode $D_1$. A sensitive current meter M is connected in series with a resistor $r_3$ between the junction point of photoresistor 4 and diode $D_1$ and the switch arm $a$.

The resistor R is coupled to one or more non-light parameter adjustments of the camera such as those of the shutter speed, diaphragm aperture and film speed. The value of the resistor $r_1$ is such that when mirror 2 is advanced to attenuate the light incident on photoresistor 4 and resistor R is adjusted to balance the network as indicated by meter M, the switch arm $c$ engaging contact element $a$, and the mirror 2 is retracted by turning knob 7 to transfer switch arm $c$ to contact element $b$, the light incident on photoresistor 4 being unattenuated by the retracted mirror, the bridge remains balanced as indicated by meter M. The increased light incident on photoresistor 4 consequent to the manual retraction of the mirror and the resulting decreased resistance of the photoresistor 4 is compensated by the automatic corresponding reduction in the resistance in another leg of the bridge network by the omission of the resistor $r_1$ from the bridge circuit since the switch arm $c$ is transferred to contact element $b$ to bypass resistor $r_1$.

As is apparent from the foregoing description, the element for compensating for the presence and the absence of the mirror in the light path to the light receiving element is moved in or away from the light measuring system in cooperation with the independent manual retraction of the mirror, said system consisting of an optical portion and electric portion. Furthermore, the movement of the compensating element in or away from the light measuring system is achieved only by effecting a minor design change in the construction used for the manual operation for retracting the mirror upwardly, such that there results a simple construction, while permitting the usual photographing operation, even when the mirror has been moved upwardly beforehand, independently of the operation of the shutter release, without the possibility of committing an erroneous operation.

While there has been described and illustrated preferred embodiments of the present invention, it is apparent that numerous alterations, additions and omissions may be made without departing from the spirit thereof. In this connection it should be noted that the light measuring system may be employed not only in the coupled adjustment of exposure parameters, but for automatic exposure control and direct light reading as well.

We claim:

1. In a single lens reflex camera including a shutter, a shutter release, an objective lens, a mirror having a semi-transparent section and moveable from an advanced position in the light path between said objective lens and said shutter to a retracted position out of said light path with the initiation of operation of said shutter release, a photo-sensitive element located in said light path behind said mirror in said advanced position thereof for receiving light from said objective lens through said semi-transparent section of the mirror and moveable with said initiation of shutter release operation out of said light path, and means for manually retracting said mirror from said light path independently of said shutter release operation, a light measuring system comprising said photo-sensitive element and means for varying the response of said light measuring system in response to the manual operation of said manually retracting mirror means to compensate for the increased amount of light directed toward said photo-sensitive element attendant to the manual retraction of said mirror out of said light path, whereby said light measuring system provides a similar measurement of the light from said objective lens with said mirror in said retracted position and in said advanced position.

2. The camera of claim 1 wherein said response varying means comprises a light attenuating member moveable with the manual retraction of said mirror to an advanced position reducing the light incident on said photosensitive element to an extent equal to the light through said semi-transparent section of the mirror and to a retracted position out of the path of light onto said light sensitive element with the advance of said mirror.

3. The camera of claim 1 wherein said light measuring system includes a circuit network responsive to said photosensitive element and said response varying means comprises means for varying a parameter of said network in response to the retraction of said mirror to compensate for a change in a parameter of said photosensitive element consequent to increased light incident thereon due to the manual retraction of said mirror.

4. The camera of claim 3 wherein said photosensitive element comprises a photoresistor and said circuit network comprises a bridge network including said photoresistor in a leg thereof and a variable resistor network in a leg thereof and said response varying means includes means for varying the resistance of said resistor network in response to the retraction of said mirror.

5. The camera of claim 4 wherein the resistance of said resistor network is reduced by a predetermined amount with the manual retraction of said mirror.

* * * * *